C. A. FRAKES.
TRANSPLANTER.
APPLICATION FILED NOV. 13, 1915.
1,198,338.
Patented Sept. 12, 1916.
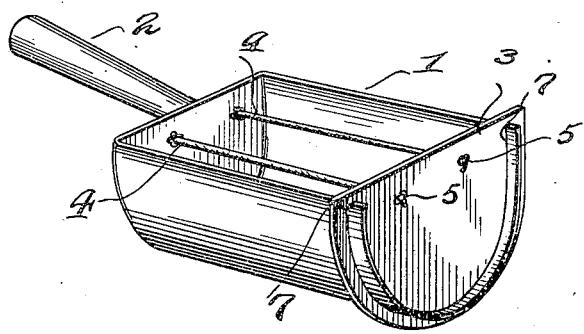
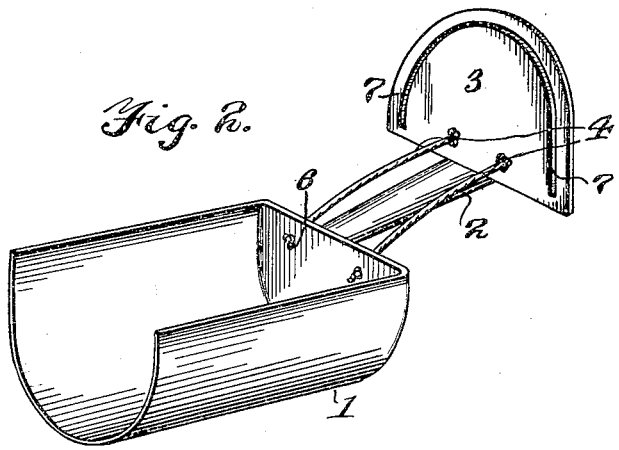
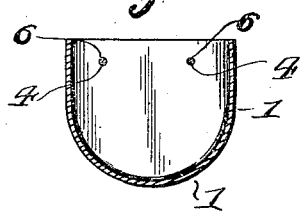
Inventor
C. A. Frakes
Witnesses
By Victor J. Evans
Attorney

UNITED STATES PATENT OFFICE.

CHARLES A. FRAKES, OF PORT ARTHUR, TEXAS.

TRANSPLANTER.

1,198,338.  Specification of Letters Patent.  Patented Sept. 12, 1916.

Application filed November 13, 1915. Serial No. 61,329.

*To all whom it may concern:*

Be it known that I, CHARLES A. FRAKES, a citizen of the United States, residing at Port Arthur, in the county of Jefferson and State of Texas, have invented new and useful Improvements in Transplanters, of which the following is a specification.

This invention relates to transplanters and consists in the novel features hereinafter described and claimed.

An object of the invention is to provide a transplanter of simple structural arrangement adapted to be used to advantage for removing plants from hot beds and placing them in proper position in an open field.

With this object in view the transplanter comprises a scoop having a handle attached thereto. A blade is connected with the scoop by means of a flexible element. When it is desired to remove a plant from a hot bed or similar place, the scoop is inserted in the soil at one side of the plant and the blade is passed down into the soil and below the roots of the plant whereby the plant with considerable soil surrounding the roots thereof is positioned in the scoop and may be readily replanted in the soil.

In the accompanying drawing: Figure 1 is a perspective view of the transplanter. The other figures are detail views of the features thereof.

The transplanter comprises a scoop 1, of tin or other suitable sheet metal, having at one end a handle 2. A blade 3 also of sheet metal is connected with the body of the scoop 1 by means of flexible elements 4. The said elements may be of string, wire or other similar material. The blade 3 is provided with openings 5 through which the said flexible elements pass, the element being provided at the opposite side of the blade with knots which hold the blade against movement longitudinally along the said flexible element. The body of the scoop 1 is also provided with openings 6 through which the said flexible elements pass. The elements at the opposite sides of the body of the scoop are provided with knots which hold the elements against movement longitudinally through the openings 6. The blade 3 is provided in the vicinity of one edge with an arcuate or curved slot 7 adapted to receive the edge of the body of the scoop 1 when the blade is in position at the lower portion of the said scoop.

In operation the scoop 1 is forced down into the soil at one side of the plant and then the blade 3 is forced down into the soil beyond the opposite side of the plant whereby a quantity of soil which surrounds the root of the plant is gathered in the lower portion of the scoop and the blade 3 is closed in against the inner side of the scoop whereby the plant and the soil are retained in the scoop. When the plant is transplanted it is lowered into an excavation made in the soil and the blade 3 is removed from under the roots of the plant and the plant with the attached soil is permitted to lodge in the excavation. The scoop is then removed from the side of the plant and the surface soil is closed around the roots of the plant in the usual manner.

From the above description taken in conjunction with the accompanying drawing, it will be seen that a transplanter of simple structural arrangement is provided and that the same may be easily and conveniently used for efficiently and properly removing plants from hot beds and placing them in the soil in an open field or road.

Having described the invention what is claimed is:—

1. A transplanter comprising a scoop, a blade adapted to fit in the scoop and a flexible element connecting the blade with the scoop.

2. A transplanter comprising a scoop, a blade adapted to fit in the scoop and having a slot adapted to receive the edge of the scoop and a flexible element connecting the blade with the scoop.

3. A transplanter comprising a scoop, a blade adapted to fit in the scoop, flexible elements passing transversely through the blade and the scoop and provided at the opposite sides of the blade and scoop with knots whereby they are restrained against longitudinal movement with relation to the blade and scoop.

In testimony whereof I affix my signature in presence of two witnesses.

CHARLES A. FRAKES.

Witnesses:
C. B. SULLIVAN,
L. E. WIGGINS.

Copies of this patent may be obtained for five cents each, by addressing the "Commissioner of Patents, Washington, D. C."